(12) United States Patent
Novak et al.

(10) Patent No.: US 7,320,137 B1
(45) Date of Patent: Jan. 15, 2008

(54) METHOD AND SYSTEM FOR DISTRIBUTING PERSONALIZED EDITIONS OF MEDIA PROGRAMS USING BOOKMARKS

(75) Inventors: Robert E. Novak, Santa Clara, CA (US); James K. Okamoto, Saratoga, CA (US); Kory D. Christensen, Kaysville, UT (US)

(73) Assignee: Digeo, Inc., Kirkland, WA (US)

( * ) Notice: Subject to any disclaimer, the term of this patent is extended or adjusted under 35 U.S.C. 154(b) by 1211 days.

(21) Appl. No.: 10/010,736

(22) Filed: Dec. 6, 2001

(51) Int. Cl.
*H04N 5/445* (2006.01)
*H04N 7/173* (2006.01)
*H04N 7/16* (2006.01)

(52) U.S. Cl. .................. 725/134; 725/55; 725/142; 715/723

(58) Field of Classification Search ............. 725/58
See application file for complete search history.

(56) References Cited

U.S. PATENT DOCUMENTS

| | | | |
|---|---|---|---|
| 4,520,404 A | 5/1985 | Von Kohorn | |
| 4,750,213 A * | 6/1988 | Novak | 455/3.01 |
| 4,879,611 A | 11/1989 | Fukui et al. | |
| 5,155,591 A | 10/1992 | Wachob | |
| 5,189,691 A | 2/1993 | Dunlap | |
| 5,343,251 A | 8/1994 | Nafeh | |
| 5,446,919 A | 8/1995 | Wilkins | |
| 5,515,511 A | 5/1996 | Nguyen et al. | |
| 5,606,361 A | 2/1997 | Davidsohn et al. | 348/14 |
| 5,610,653 A * | 3/1997 | Abecassis | 348/170 |
| 5,625,864 A | 4/1997 | Budow et al. | 455/4.2 |
| 5,706,388 A | 1/1998 | Isaka | |
| 5,740,304 A | 4/1998 | Katsuyama et al. | |
| 5,760,767 A | 6/1998 | Shore et al. | |
| 5,774,186 A | 6/1998 | Brodsky et al. | |
| 5,805,235 A | 9/1998 | Bedard | 348/569 |
| 5,818,440 A | 10/1998 | Allibhoy et al. | |
| 5,884,056 A | 3/1999 | Steele | 395/339 |
| 5,892,536 A * | 4/1999 | Logan et al. | 725/34 |
| 5,896,165 A | 4/1999 | Rao | |
| 5,907,322 A | 5/1999 | Kelly et al. | |
| 5,936,679 A | 8/1999 | Kasahara et al. | |
| 5,949,474 A | 9/1999 | Gerzberg et al. | |
| 5,956,716 A | 9/1999 | Kenner et al. | |
| 5,973,723 A | 10/1999 | DeLuca | |
| 5,999,207 A | 12/1999 | Rodriguez et al. | |
| 6,034,679 A | 3/2000 | McGrath | |
| 6,055,513 A | 4/2000 | Katz et al. | 705/26 |
| 6,061,435 A | 5/2000 | Grundvig et al. | |

(Continued)

OTHER PUBLICATIONS

"Question of the Day," www.howstuffworks.com, Sep. 20, 2002, 11 pages.

(Continued)

*Primary Examiner*—Kieu-Oanh Bui
(74) *Attorney, Agent, or Firm*—Kory D. Christensen; Stoel Rives LLP

(57) ABSTRACT

An editing device accesses a media program and a user of the editing device designates points of interest within the media program. Bookmarks are generated for the designated points of interest. The bookmarks are transmitted via a network from the editing device to a playback device. During presentation of the media program, the playback device uses the bookmarks to skip to one position of interest to another, as defined by the bookmarks, in response to user commands.

49 Claims, 8 Drawing Sheets

U.S. PATENT DOCUMENTS

| | | | |
|---|---|---|---|
| 6,064,380 A | 5/2000 | Swenson et al. | 345/328 |
| 6,118,924 A | 9/2000 | Nakatani et al. | |
| 6,125,515 A | 10/2000 | Boliek et al. | |
| 6,141,058 A | 10/2000 | Lagoni et al. | |
| 6,166,731 A | 12/2000 | Duvall et al. | |
| 6,215,515 B1 | 4/2001 | Voois et al. | |
| 6,233,389 B1 | 5/2001 | Barton et al. | |
| 6,243,448 B1 | 6/2001 | Corbett et al. | |
| 6,262,724 B1 | 7/2001 | Crow et al. | 345/328 |
| 6,289,346 B1* | 9/2001 | Milewski et al. | 707/10 |
| 6,438,751 B1* | 8/2002 | Voyticky et al. | 725/42 |
| 6,642,939 B1* | 11/2003 | Vallone et al. | 715/721 |
| 6,725,241 B1 | 4/2004 | Rodriguez et al. | |
| 6,757,482 B1 | 6/2004 | Ochiai et al. | |
| 6,798,976 B2 | 9/2004 | Tsumagari et al. | |
| 6,816,666 B1 | 11/2004 | Kanai et al. | |
| 6,868,225 B1 | 3/2005 | Brown et al. | |
| 6,915,510 B1 | 7/2005 | Tock et al. | |
| 6,951,031 B2* | 9/2005 | Hatano | 725/50 |
| 7,032,177 B2 | 4/2006 | Novak et al. | |
| 7,103,906 B1* | 9/2006 | Katz et al. | 725/87 |
| 7,143,353 B2* | 11/2006 | McGee et al. | 715/723 |
| 2001/0038690 A1 | 11/2001 | Palmer et al. | |
| 2001/0052125 A1 | 12/2001 | Kim | |
| 2002/0032907 A1 | 3/2002 | Daniels et al. | |
| 2002/0054071 A1 | 5/2002 | Yamaguchi et al. | |
| 2002/0069218 A1 | 6/2002 | Sull et al. | 707/501.1 |
| 2002/0162116 A1 | 10/2002 | Read et al. | |
| 2002/0163532 A1 | 11/2002 | Thomas et al. | |
| 2002/0172330 A1 | 11/2002 | Brunelle et al. | |
| 2003/0016951 A1 | 1/2003 | Jakel et al. | 386/125 |
| 2003/0086691 A1 | 5/2003 | Yu | |
| 2003/0163832 A1 | 8/2003 | Tsuria et al. | |
| 2003/0172383 A1 | 9/2003 | Takagi et al. | |
| 2004/0045040 A1* | 3/2004 | Hayward | 725/135 |
| 2004/0139047 A1 | 7/2004 | Rechsteiner et al. | |
| 2004/0223737 A1 | 11/2004 | Johnson | |

OTHER PUBLICATIONS

FCD V-Chip, "V-Chip: Viewing Television Responsibly," "Excerpts from V-Chip Legislation," And "The V-Chip," www.fee.gov/vchip, 11 pages.

Office Action Mailed Aug. 9, 2006, for U.S. Appl. No. 10/034,201, filed Dec. 27, 2001.

Office Action Mailed Sep. 12, 2006, for U.S. Appl. No. 10/109,626, filed Mar. 28, 2002.

Office Action Mailed Apr. 19, 2007, for U.S. Appl. No. 10/109,626, filed Mar. 28, 2002.

Office Action Mailed Apr. 20, 2007, for U.S. Appl. No. 10/328,940, filed Dec. 24, 2002.

Office Action Mailed Dec. 1, 2005, for U.S. Appl. No. 09/956,756, filed Sep. 19, 2001.

Office Action Mailed Sep. 20, 2006, for U.S. Appl. No. 09/956,756, filed Sep. 19, 2001.

Office Action Mailed Jun. 1, 2007, for U.S. Appl. No. 09/956,756, filed Sep. 19, 2001.

* cited by examiner

METHOD AND SYSTEM FOR DISTRIBUTING PERSONALIZED EDITIONS OF MEDIA PROGRAMS USING BOOKMARKS

BACKGROUND

1. Field of the Invention

The present invention relates generally to the field of multimedia. More specifically, the present invention relates to a system and method for distributing personalized editions of media programs using bookmarks.

2. Description of Related Background Art

In recent years, the distribution of audio and video programs in a digital format has witnessed a tremendous increase in popularity. For example, compact discs (CDs) and digital versatile discs (DVDs) are now ubiquitous in the industry. Moreover, personal video recorders (PVRs), which digitally record broadcast television programs, are now replacing analog video cassette recorders (VCRs) in many households.

Digital editing of media programs by consumers is also becoming more popular. Today, consumers may digitally record and edit a television program to create a personalized edition that is free of commercials or that only contain highlights.

Users may desire to share these personalized editions with their friends or relatives. Unfortunately, a number of obstacles limit a consumer's ability to share an edited version of a media program with other people. First, storing media content, particularly video, in a digital format consumes a large amount of storage space. For example, a two hour movie may easily include more data than may be conveniently stored on a CD-ROM. Likewise, transmitting media content via a network, such as the Internet, consumes a great deal of bandwidth. Consequently, transmitting an edited version of a program to a friend may be both slow and expensive.

Second, sharing personalized editions of media programs may violate copyright laws. In the United States, the Digital Millennium Copyright Act (DMCA) imposes limitations on sharing protected content in a digital format. Moreover, recent decisions involving Napster and other companies have highlighted the copyright issues raised in file sharing.

Thus, it would be an advancement in the art to provide a technique for distributing personalized editions of media programs that does not consume excessive bandwidth or violate applicable copyright laws.

BRIEF DESCRIPTION OF THE DRAWINGS

Non-limiting and non-exhaustive embodiments of the invention are described with reference to the figures, in which.

DETAILED DESCRIPTION OF THE PREFERRED EMBODIMENTS

Figure 1:
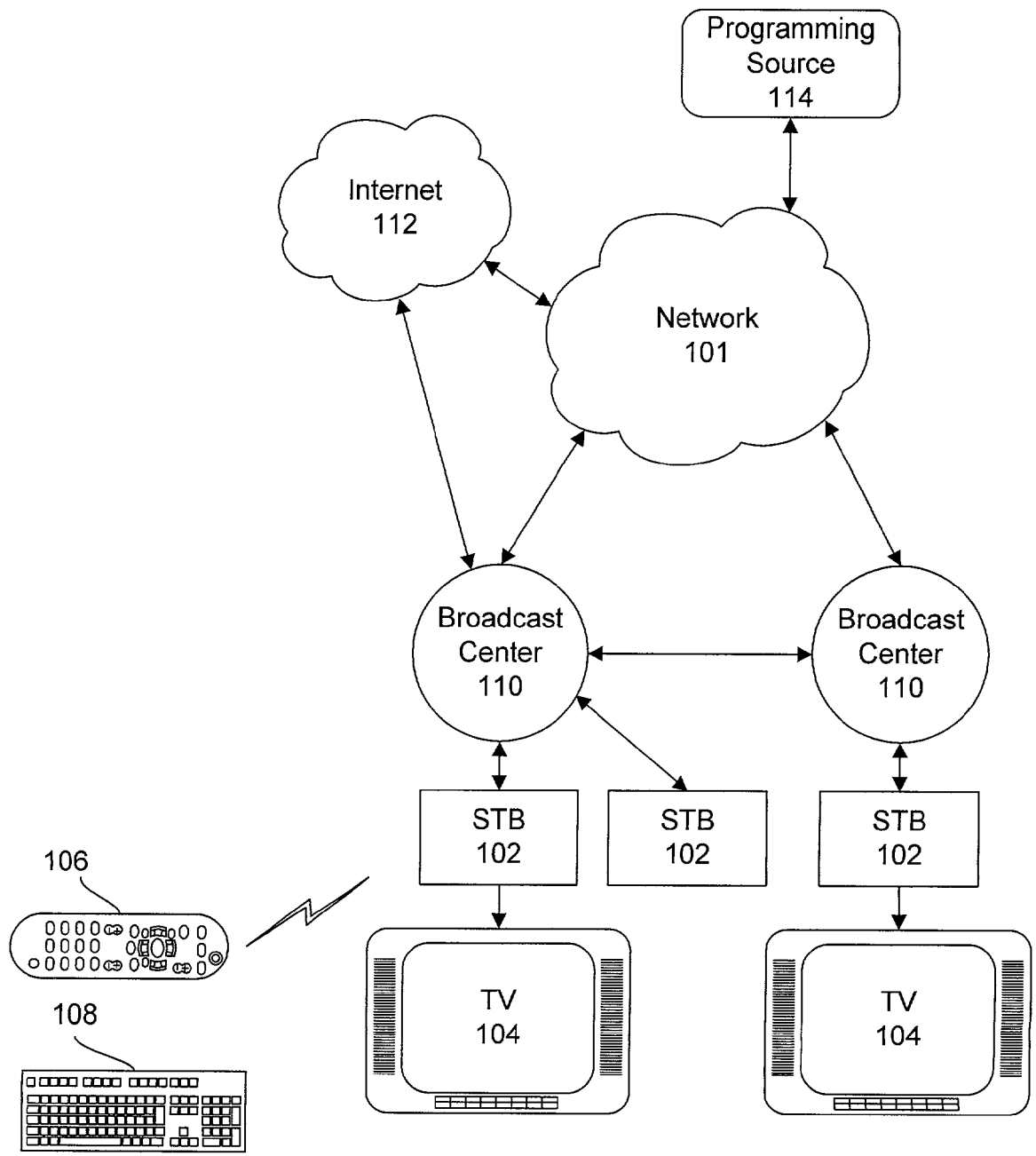
FIG. 1 is a block diagram of a communication system.

The present invention relates to a system and method for distributing personalized editions of media programs that addresses the above-identified problems and disadvantages. In one embodiment, an editing device accesses a copy of a media program. The editing device may include, for instance, an interactive television (ITV) system, a personal computer, a mobile computing device, or the like. The media program may include any type of audio and/or video program, such as a movie stored on a DVD or a television program recorded by a personal video recorder (PVR).

In one implementation, a user of the editing device designates one or more points of interest within the media program. The points of interest may correspond to the starting locations of highlights within the media program. Alternatively, the points of interest may correspond to the ending locations of commercials or other segments of lesser interest.

The editing device then generates a bookmark that defines each designated point of interest. The bookmark may include a time index, a frame index, an offset, a chapter reference, a scene reference, or other indicator of position within the media program. In certain embodiments, the bookmark may be embodied as a directive to a playback device to begin playback at particular location within the media program.

The generated bookmarks may be transmitted from the editing device to one or more playback devices via a network, such as a broadband cable network, the Internet, a local area network (LAN), a wireless network, or the like. The playback device may likewise be embodied as an ITV system, personal computer, mobile computing device, etc.

The playback device then accesses a copy of the media program from the same or a different source as the editing device. For example, the playback device may access a copy of the media program on a DVD or may independently record the media program from a broadcast medium.

During playback of the media program, the playback device may use the received bookmarks to skip from one point of interest to another in response to a user command. For example, a user may press a skip forward or skip backward button on a remote control to cause the playback device to play the media program at locations defined by different bookmarks.

As a consequence, a user may rapidly and conveniently share a personalized edition of a media program with friends or relatives without having to transmit the media program, itself. Because the bookmarks may simply include time or positional indexes, the bookmarks are relatively small in size compared to the media program, facilitating rapid transmission thereof between the editing device and the playback device. Moreover, since the media program, itself, is not sent between the devices, copyright laws are not violated by the transmission.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Referring now to FIG. 1, there is shown a communication system 100 according to an embodiment of the invention. In one implementation, the system 100 includes a broadband communication network 101, such as a cable television network or direct satellite broadcast (DBS) network, although other networks are possible.

The system 100 may include a plurality of set top boxes (STBs) 102 located, for instance, at customer homes or offices. Generally, an STB 102 is a consumer electronics device that serves as a gateway between a customer's television 104 and the network 101. In alternative embodiments, an STB 102 may be embodied more generally as a personal computer, an advanced television 104 with STB-like functionality, or another type of customer premises equipment (CPE). While the following description makes particular reference to STBs, it should be recognized that a wide variety of comparable devices may be used within the scope of the invention. Accordingly, the invention should not be construed as being limited to interactive television (ITV) systems.

An STB 102 receives encoded television signals and other information from the network 101 and decodes the same for display on the television 104 or other display device, such as a computer monitor. As its name implies, an STB 102 is typically located on top of, or in close proximity to, the television 104.

Each STB 102 may be distinguished from other network components by a unique identifier, number, code, or address, such as an Internet Protocol (IP) address (e.g., IPv6), a Media Access Control (MAC) address, or the like. Thus, video signals and other information may be transmitted from the network 101 to a specific STB 102 by addressing the same with the correct address, after which the network 101 routes the transmission to its destination using conventional techniques.

A remote control 106 is provided, in one configuration, for convenient remote operation of the STB 102 and the television 104. The remote control 106 may use infrared (IR), radio frequency (RF), or other wireless technologies to transmit control signals to the STB 102 and the television 104. Other remote control devices are also contemplated, such as wired or wireless mice (not shown).

Additionally, a keyboard 108 (either wireless or wired) is provided, in one embodiment, to allow a user to rapidly enter text information into the STB 102. Such text information may be used for e-mail, instant messaging (e.g. text-based chat), or the like. In various embodiments, the keyboard 108 may use IR, RF, or other wireless technologies to transmit keystroke data to the STB 102.

Each STB 102 may be coupled to the network 101 via a broadcast center 110. In the context of a cable television network, a broadcast center 110 is often referred to as a "head-end", which is generally a centrally-located facility within a community where television programming is received from a local cable TV satellite downlink or other source and packaged together for transmission to customer homes. In one configuration, a head-end also functions as a Central Office (CO) in the telecommunication industry, routing video signals and other data to and from the various STBs 102 serviced thereby.

A broadcast center 110 may also be embodied as a satellite broadcast center within a direct broadcast satellite (DBS) system. A DBS system may utilize a small 18-inch satellite dish, which is an antenna for receiving a satellite broadcast signal. Each STB 102 may include a digital integrated receiver/decoder (IRD), which separates each channel, and decompresses and translates the digital signal from the satellite dish to be displayed by the television 104.

Programming for a DBS system may be distributed, for example, by multiple high-power satellites in geosynchronous orbit, each with multiple transponders. Compression (e.g., MPEG) may be used to increase the amount of programming that can be transmitted in the available bandwidth.

The broadcast centers 110 may be used to gather programming content, ensure its digital quality, and uplink the signal to the satellites. Programming may be received by the broadcast centers 110 from content providers (CNN®, ESPN®, HBO®, TBS®, etc.) via satellite, fiber optic cable and/or special digital tape. Satellite-delivered programming is typically immediately digitized, encrypted and uplinked to the orbiting satellites. The satellites retransmit the signal back down to every earth-station, e.g., every compatible DBS system receiver dish at customers' homes and businesses.

Some broadcast programs may be recorded on digital videotape in the broadcast center 110 to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

Regardless of the nature of the network 101, the broadcast centers 110 may be coupled directly to one another or through the network 101. In alternative embodiments, broadcast centers 110 may be connected via a separate network, one particular example of which is the Internet 112. The Internet 112 is a "network of networks" and is well known to those skilled in the art. Communication over the Internet 112 is accomplished using standard protocols, such as TCP/IP (Transmission Control Protocol/Internet Protocol) and the like.

A broadcast center 110 may receive television programming for distribution to the STBs 102 from one or more television programming sources 114 coupled to the network 101. Preferably, television programs are distributed in an encoded format, such as MPEG (Moving Picture Experts Group).

MPEG is a form of predictive coding. In predictive coding, how and how much a next image changes from a previous one is calculated, and codes are transmitted indicating the difference between images, rather than the image itself. In MPEG, the images or frames in a sequence are typically classified into three types: I frames, P frames, and B frames. An I frame (or intrapicture) is an image that is coded without reference to any other images. A P frame (or predicted picture) is an image that is coded relative to one other image. A B frame (or bi-directional picture) is an image that is derived from two other images, one before and one after.

Various MPEG standards are known, such as MPEG-2, MPEG-4, MPEG-7, and the like. Thus, the term "MPEG," as used herein, contemplates all MPEG standards. Moreover, other video encoding/compression standards exist other than MPEG, such as JPEG, JPEG-LS, H.261, and H.263. Accordingly, the invention should not be construed as being limited only to MPEG.

Broadcast centers 110 may be used to enable audio and video communications between STBs 102. Transmission between broadcast centers 110 may occur (i) via a direct peer-to-peer connection between broadcast centers 110, (ii) upstream from a first broadcast center 110 to the network 101 and then downstream to a second broadcast center 110, or (iii) via the Internet 112. For instance, a first STB 102 may send a video transmission upstream to a first broadcast center 110, then to a second broadcast center 110, and finally downstream to a second STB 102.

Of course, the communication system 100 illustrated in FIG. 1 is merely exemplary, and other types of devices and networks may be used within the scope of the invention.

Figure 2:
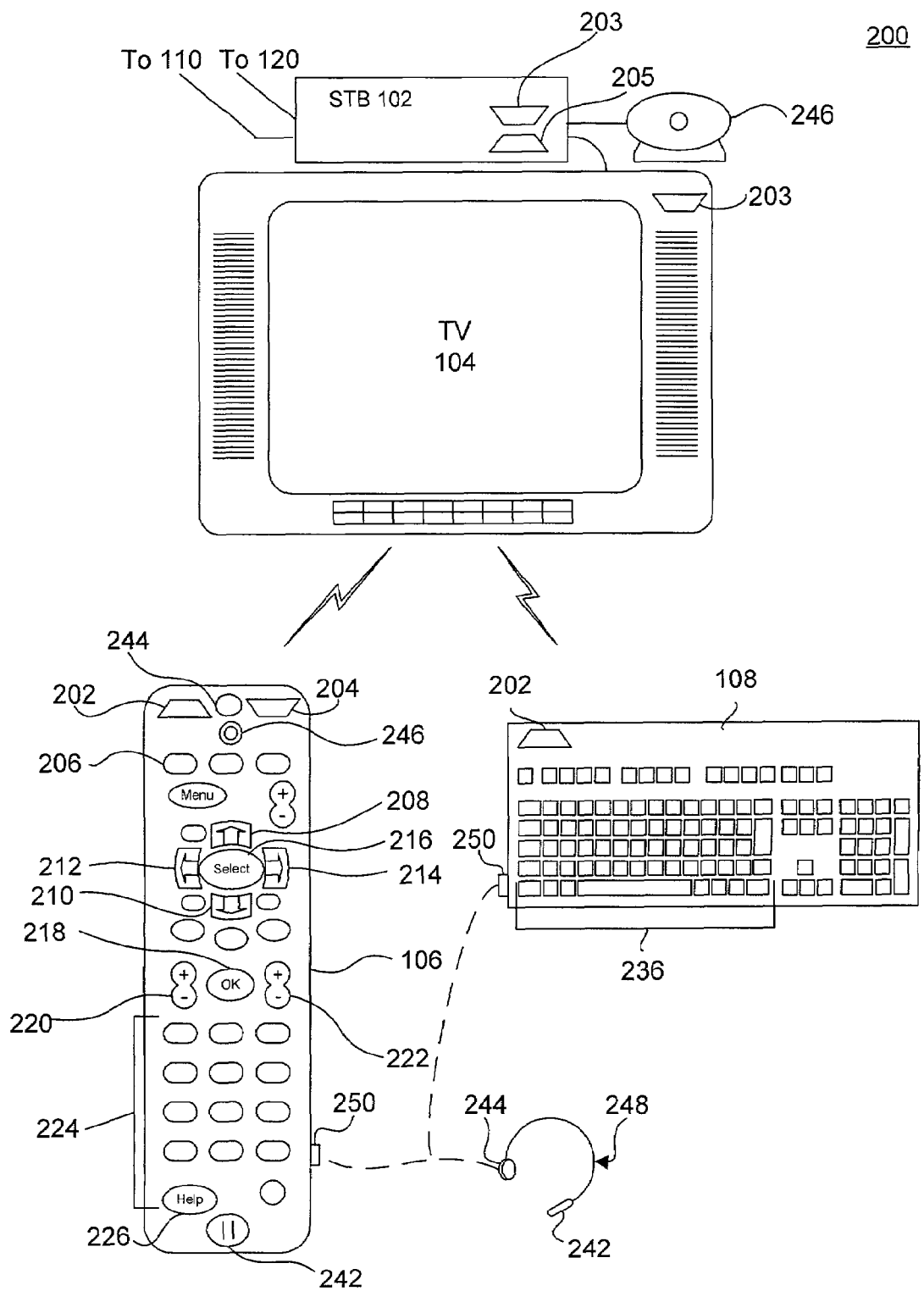
FIG. 2 is an illustration of an interactive television (ITV) system.

Referring now to FIG. 2, there is shown an interactive television (ITV) system 200 according to an embodiment of the invention. As depicted, the system 200 may include an STB 102, a television 104 (or other display device), a remote control 106, and, in certain configurations, a keyboard 108.

The remote control 106 is provided for convenient remote operation of the STB 102 and the television 104. In one configuration, the remote control 106 includes a wireless transmitter 202 for transmitting control signals (and possibly audio/video data) to a wireless receiver 203 within the STB 102 and/or the television 104. In certain embodiments, the remote control 106 includes a wireless receiver 204 for receiving signals from a wireless transmitter 205 within the STB 102. Operational details regarding the wireless transmitters 202, 205 and wireless receivers 203, 204 are generally well known to those of skill in the art.

The remote control 106 preferably includes a number of buttons or other similar controls. For instance, the remote control 106 may include a power button 206, an up arrow button 208, a down arrow button 210, a left arrow button 212, a right arrow button 214, a "Select" button 216, an "OK" button 218, channel adjustment buttons 220, volume adjustment buttons 223, alphanumeric buttons 224, a "Help" button 226, and the like.

Figure 3:
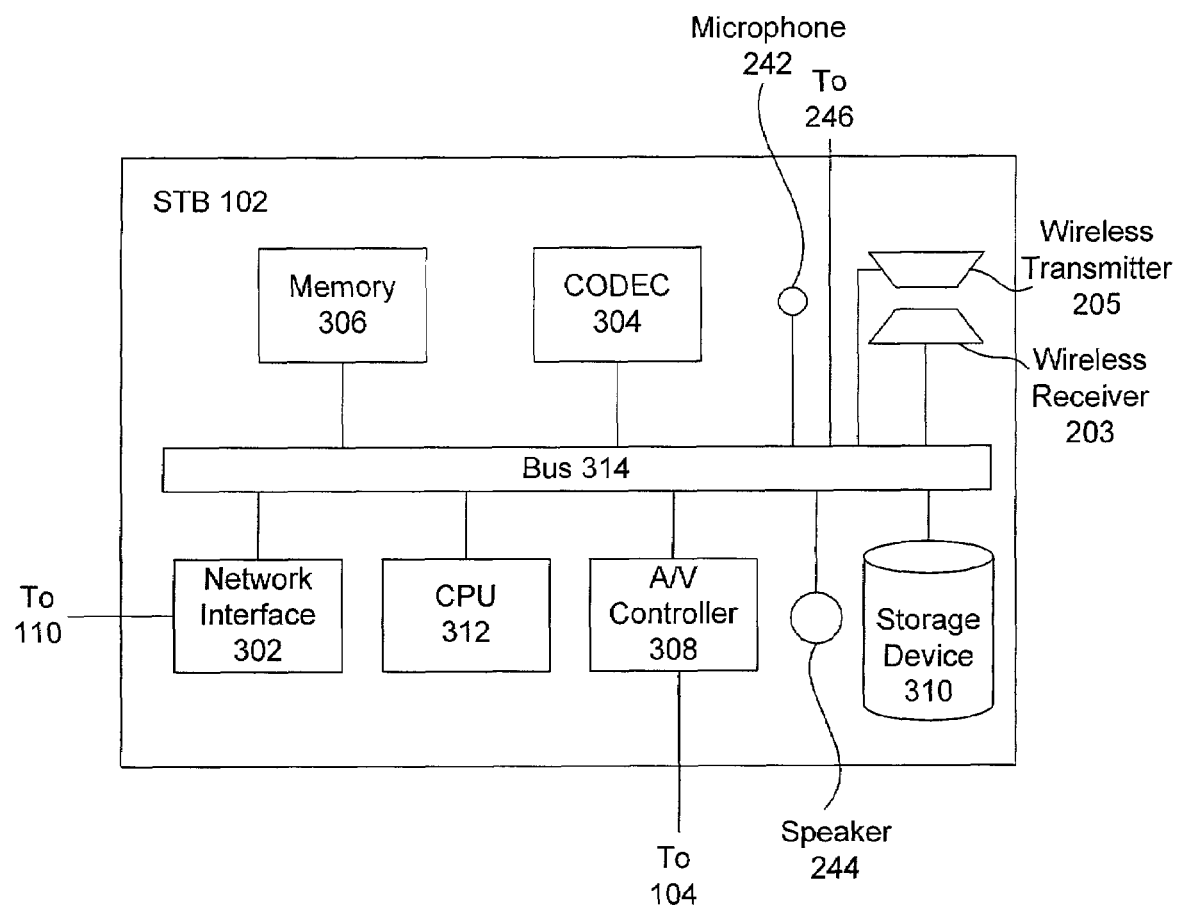
FIG. 3 is a block diagram of physical components of a set top box (STB)

In one embodiment, the remote control 106 includes a microphone 242 for capturing audio signals. The captured audio signals may be transmitted to the STB 102 via the wireless transmitter 202. In addition, the remote control 106 may include a speaker 244 for generating audible output from audio signals received from the STB 102 via the wireless receiver 204. In alternative embodiments, as shown in FIG. 3, the microphone 242 and/or speaker 244 may be integrated with the STB 102.

In certain embodiments, the remote control 106 further includes a video camera 246, such as a CCD (charge-coupled device) digital video camera, for capturing video signals. In one implementation, the video camera 246 is in electrical communication with the wireless transmitter 202 for sending the captured video signals to the STB 102. Like the microphone 242 and speaker 244, the video camera 246 may be integrated with the STB 102, or attached to the STB 102, as in the depicted embodiment.

The various components of the remote control 106 may be positioned in different locations for functionality and ergonomics. For example, as shown in FIG. 2, the speaker 244 may be positioned near the "top" of the remote control 106 (when viewed from the perspective of FIG. 2) and the microphone 242 may be positioned at the "bottom" of the remote control 106. Thus, in one embodiment, a user may conveniently position the speaker 244 near the user's ear and the microphone 242 near the user's mouth in order to operate the remote control 106 in the manner of a telephone. Of course, the remote control 106 may be embodied as a standard remote control, without audio/video capture capability.

The optional keyboard 108 facilitates rapid composition of text messages. The keyboard 108 includes a plurality of standard alphanumeric keys 236. In one configuration, the keyboard 108 includes a wireless transmitter (not shown), similar or identical to the wireless transmitter 202 of the remote control 106. The wireless transmitter 202 transmits keystroke data from the keyboard 108 to the STB 102. Additionally, the keyboard 108 may include one or more of the buttons illustrated on the remote control 106.

Alternatively, or in addition, a hands-free headset 248 may be coupled to the remote control 106 or the keyboard 108. The headset 248 may be coupled using a standard headset jack 250. The headset 248 may include a microphone 242 and/or speaker 244. Such a headset 248 may be used to reduce audio interference from the television 104 in order to improve audio quality and to provide the convenience of hands-free operation.

Referring now to FIG. 3, there is shown a block diagram of physical components of an STB 102 according to an embodiment of the invention. As noted above, the STB 102 includes a wireless receiver 203 for receiving control signals sent by the wireless transmitter 202 in the remote control 106 and a wireless transmitter 205 for transmitting signals (such as audio/video signals) to the wireless receiver 204 in the remote control 106.

The STB 102 also includes, in one implementation, a network interface 302 for communicating with the network 101 via the broadcast center 110. The interface 302 may include conventional circuitry for receiving, demodulating, and demultiplexing MPEG packets. The interface 302 may also include conventional modem circuitry for sending or receiving data. For example, the interface 302 may conform to the DOCSIS (Data Over Cable Service Interface Specification) or DAVIC (Digital Audio-Visual Council) cable modem standards.

In one configuration, one or more frequency bands (for example, from 5 to 30 MHz) may be reserved for upstream transmission. Digital modulation (for example, quadrature amplitude modulation or vestigial sideband modulation) may be used to send digital signals in the upstream transmission. Of course, upstream transmission may be accomplished differently for different networks 101. Alternative ways to accomplish upstream transmission include using a back channel transmission, which is typically sent via an analog telephone line, ISDN, DSL, or other techniques.

The STB 102 also preferably includes a codec (encoder/decoder) 304, which serves to encode audio/video signals into a network-compatible data stream for transmission over the network 101. The codec 304 also serves to decode a network-compatible data stream received from the network 101. The codec 304 may be implemented in hardware and/or software. Moreover, the codec 304 may use various standard algorithms, such as MPEG and/or Voice over IP (VoIP), for encoding and decoding.

The STB 102 further includes a memory device 306, such as a random access memory (RAM), for storing temporary data. Similarly, a read-only memory (ROM) may be provided for storing more permanent data, such as fixed code and configuration information.

In one embodiment, an audio/video (A/V) controller 308 is provided for converting digital audio/video signals into analog signals for playback/display on the television 104. The A/V controller 308 may be implemented using one or more physical devices, such as separate graphics and sound controllers. The A/V controller 308 may include graphics hardware for performing bit-block transfers (bit-blits) and other graphical operations for displaying a graphical user interface (GUI) on the television 104.

In some implementations, the STB 102 may include a storage device 310, such as a hard disk drive or the like. The storage device 310 may be configured to store encoded incoming and outgoing video signals as well as television broadcasts and retrieve the same at a later time for display. The storage device 310 may be configured, in one embodiment, as a personal video recorder (PVR), enabling scheduled recording of television programs, pausing (buffering) live video, etc. The storage device 310 may also be used in various embodiments to store viewer preferences, parental lock settings, electronic program guide (EPG) data, passwords, e-mail messages, video messages, video greetings, and the like. In one implementation, the storage device 310 also stores an operating system (OS) for the STB 102, such as Windows CE® or Linux®. In some implementations, a storage device 310 may be provided that accepts removable media, such as CD-ROMs, DVDs, or the like.

As noted above, the STB 102 may include, in certain embodiments, a microphone 242 and a speaker 244 for capturing and reproducing audio signals, respectively. The STB 102 may also include or be coupled to a video camera 246 for capturing video signals. These components may be included in lieu of or in addition to similar components in the remote control 106, keyboard 108, and/or television 104.

A CPU 312 controls the operation of the STB 102, including the other components thereof, which are coupled to the CPU 312 in one embodiment via a bus 314. The CPU 312 may be embodied as a microprocessor, a microcontroller, a digital signal processor (DSP) or other device known in the art. For instance, the CPU 312 may be embodied as an Intel® x86 processor. As noted above, the CPU 312 may perform logical and arithmetic operations based on program code stored within the memory 306 or the storage device 310.

Of course, FIG. 3 illustrates only one possible configuration of an STB 102. Those skilled in the art will recognize that various other architectures and components may be provided within the scope of the invention. In addition, various standard components are not illustrated in order to avoid obscuring aspects of the invention.

Figure 4:
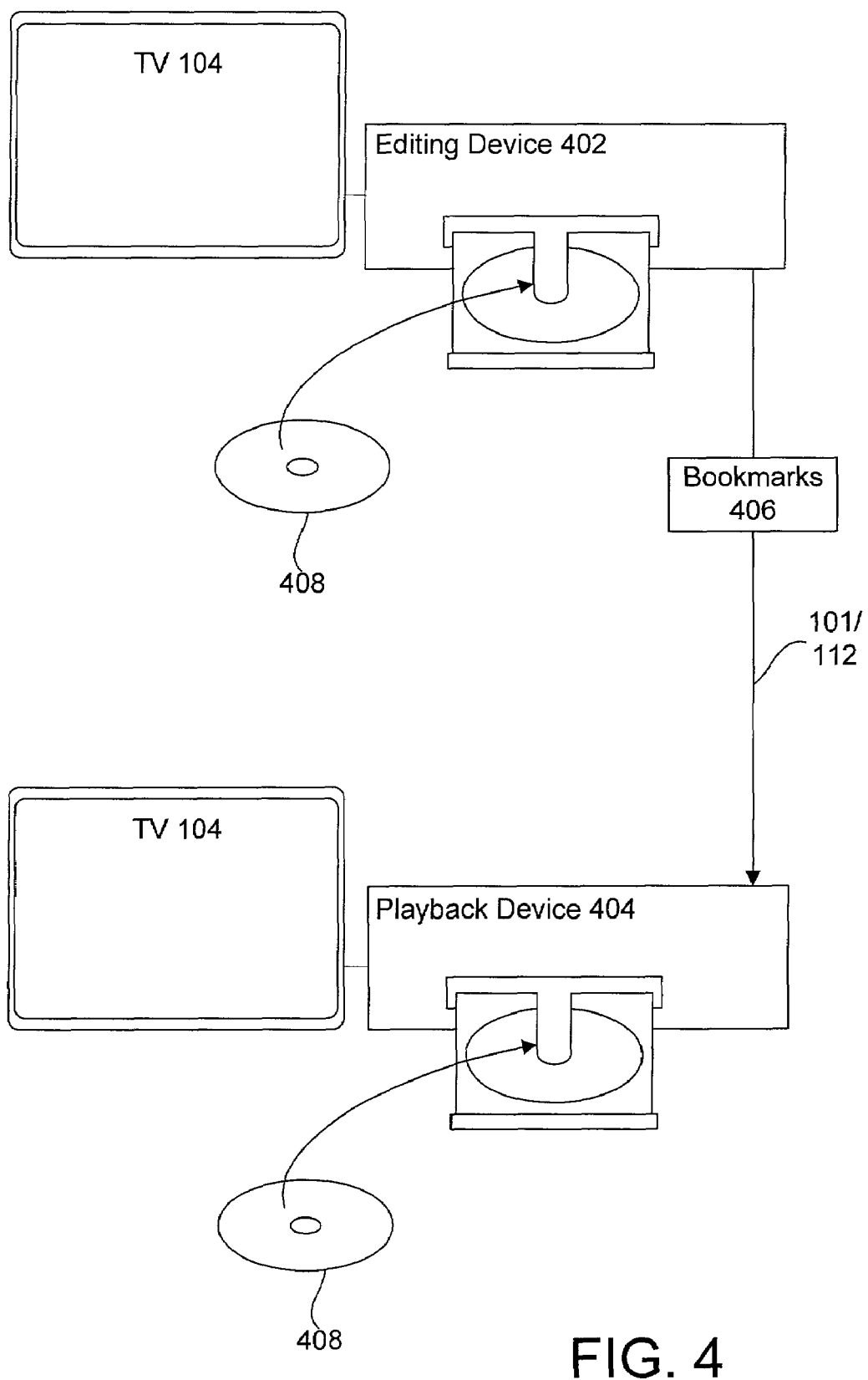
FIG. 4 is a block diagram of a system for creating and distributing personalized editions of media programs.

Referring now to FIG. 4, there is shown a system 400 for creating and distributing personalized editions of media programs. In the depicted embodiment, the system 400 includes an editing device 402 and a playback device 404, either of which may be embodied as an STB 102, personal computer, mobile computing device, or the like.

The editing device 402 may be linked to the playback device 404 by a network, such as a broadband network 101, a wireless network, or the Internet 112. As described in greater detail below, the network is used to transmit one or more bookmarks 406 from the editing device 402 to the playback device 404. As explained in greater detail below, the bookmarks 406 define points of interest within a media program, and may be used by the playback device 404 to selectively skip from one point of interest to another during playback of the media program.

In one embodiment, a copy of a media program is received by the editing device 402. The media program may be any type of audio and/or video program, such as a movie, television show, concert, or the like. As depicted, the media program may be received from a physical storage medium, such as a DVD 408. Alternatively, the media program may be recorded by the editing device 402 from a broadcast medium (e.g., cable or satellite television), or downloaded from a server, such as a video-on-demand (VoD) server.

Figure 5:
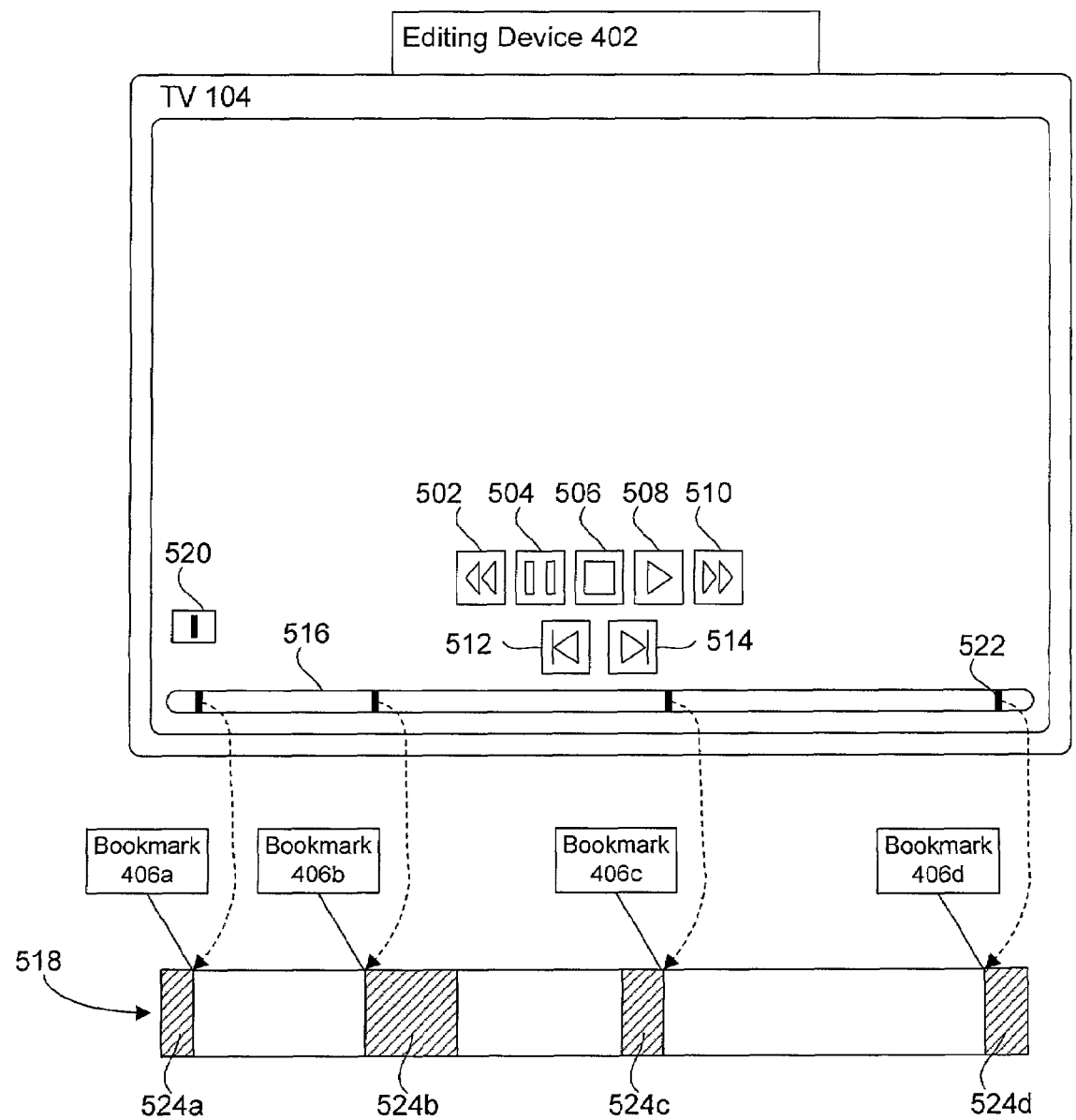
FIG. 5 illustrates a technique for defining bookmarks for points of interest within a media program.

As shown in FIG. 5, the editing device 402 allows a user to designate one or more points of interest within the media program. A point of interest may correspond to the beginning point of an interesting segment of the program, such as a significant play in a football game. Alternatively, a point of interest may correspond to the end point of a less interesting segment (e.g., an advertisement, an offensive scene, etc).

As illustrated, the editing device 402 may provide on-screen controls for assisting the user in designating points of interest. The on-screen controls may include, for instance, a rewind control 502, a pause control 504, a stop control 506, a play control 508, a fast forward control 510, a skip-backward control 512, and a skip-forward control 514. Each of the foregoing controls may be used to navigate playback of the media program until a point of interest is reached. Corresponding physical controls (e.g., buttons) may be included on the remote control 106.

In one configuration, the editing device 402 also provides an on-screen status bar 516, which is a graphical representation of the media program. Each point along the status bar 516 may represent a corresponding point in time within the media program. For clarity of description, FIG. 5 also depicts an abstract representation 518 of the media program.

In one implementation, a user of the editing device 402 navigates to a point of interest within the media program using the on-screen controls (or buttons on the remote control 106). When the point of interest is reached, the user marks the point of interest by activating a marking control 520, which may result in a marker 522 being displayed at a corresponding location of the on-screen representation 516 of the media program.

In alternative embodiments, a user need not navigate to the position of interest. Rather, the user may "drag and drop" the marker 522 to a desired location on the on-screen representation 516 of the media program, which likewise results in the generation of a corresponding bookmark 406.

In one implementation, multiple sets of bookmarks 406 may be associated with a single media program. For example, each set of bookmarks 406 may correspond to scenes in which a different actor or actress appears in a particular movie. Markers 522 for each set of bookmarks 406 may be displayed in a different color on the on-screen representation 516 of the media program.

In addition, a bookmark 406 defining the marked point of interest is generated. As previously noted, a bookmark 406 may be embodied as a time index, i.e., an indication of a point of time within the media program. For example, a bookmark 406 may include a time index of "00:30:25", which may indicate a point in time that is 30 minutes and 25 seconds from the beginning of the media program. Alternatively, a bookmark 406 may be embodied as a frame index, offset, chapter reference, scene reference, or other positional indicator within the media program.

In certain embodiments, a bookmark 406 may include a directive to a playback device 404 to skip to a particular time or position within the media program. For example, a bookmark 406 may include a directive to skip backward or forward a fixed period of time (e.g., 132.3 seconds), to skip to another bookmark 406, or to start or stop playback.

The bookmarks may include additional information, such as commentary by a user of the editing device 402. The additional information may be text, a hyperlink, an image, audio, or video. The commentary may be overlayed on the media program while it is presented at the playback device 404, for example, as pop-up text or a picture-in-picture video commentary.

As depicted in FIG. 5, bookmarks 406 may be used for many different purposes. For example, bookmarks 406b and 406d may mark beginning points of segments of greater interest 524b, 524d. Likewise, bookmarks 406a and 406d may mark end points of segments of lesser interest 524a, 524c. A segment of greater interest 524b, 524d may include, for instance, highlights from a football game or a significant or entertaining scene from a movie. A segment of lesser interest 524a, 524c, on the other hand, may include a commercial advertisement from broadcast television program or an insignificant, boring, or offensive scene. By marking the end of a segment of lesser interest 524a, 524c, a user of a playback device 404 may rapidly skip past the segment when it is encountered, e.g., when a commercial break begins.

Referring again to FIG. 4, one or more bookmarks 406 corresponding to points of interest may be transmitted from the editing device 402 to the playback device 404 via the network 101, 112. While FIG. 4 illustrates only a single playback device 404, the bookmarks 406 may be sent to multiple devices 404. For example, a user may send the bookmarks 406 to the playback devices 404 of several different friends or family members. The bookmarks 406 may be sent in an e-mail message or by various standard protocols, such as HTTP, FTP, or the like.

Transmission of bookmarks 406 may also occur using wireless transmission techniques, such as infrared (IR) or radio frequency (RF) transmission. Alternatively, bookmarks 406 may be stored on a removable storage medium at the editing device 402, and then physically transported and copied to or accessed by the playback device 404.

In one embodiment, a copy of the same media program is also accessed by the playback device 404. For example, the playback device may access a copy of the media program on a DVD 408 or may independently record the media program from a broadcast medium.

The received bookmarks 406 may be used during presentation of the media program by the playback device 404 to present a personalized edition of the media program, e.g., a personalized path through the program. For example, a user may skip to a location defined by a previous or next bookmark 406 using a skip-backward or a skip-forward on-screen control 512, 514 or a similar button on a remote control 106. Thus, a user of the playback device 404 may easily skip from one point of interest to another within the media program, watching only the highlights, as defined by the user of the editing device 402. Likewise, a user of the playback device 404 may easily skip segments of lesser interest, such as commercials, where bookmarks 406 have been defined at the end of such segments.

In certain embodiments, multiple bookmarks 406 may be placed in sequential order (e.g., by time or position) by the playback device 404, where such was not already done by the editing device 402. For instance, a user of the editing device 402 may generate the bookmarks 406 in any order. Nevertheless, the editing device 402 and/or the playback device 404 may arrange the bookmarks 406 in sequential order. In an alternative embodiment, a user of the editing device 402 may have intended to create a non-linear or non-chronological path through the media program. In such a case, an indication of the order may be sent with the bookmarks 406, which may be used or ignored by the playback device 404, as desired.

The bookmarks 406 may also be used by the editing device 402 to present a personalized edition of the media program. For instance, the editing device 402 may store sets of bookmarks 406 corresponding to different media programs stored on DVD. The user need only supply the correct DVD and load the appropriate set of bookmarks 406 in order to watch the personalized edition. Likewise, multiple sets of bookmarks 406 may be stored at the playback device 406.

Figure 6:
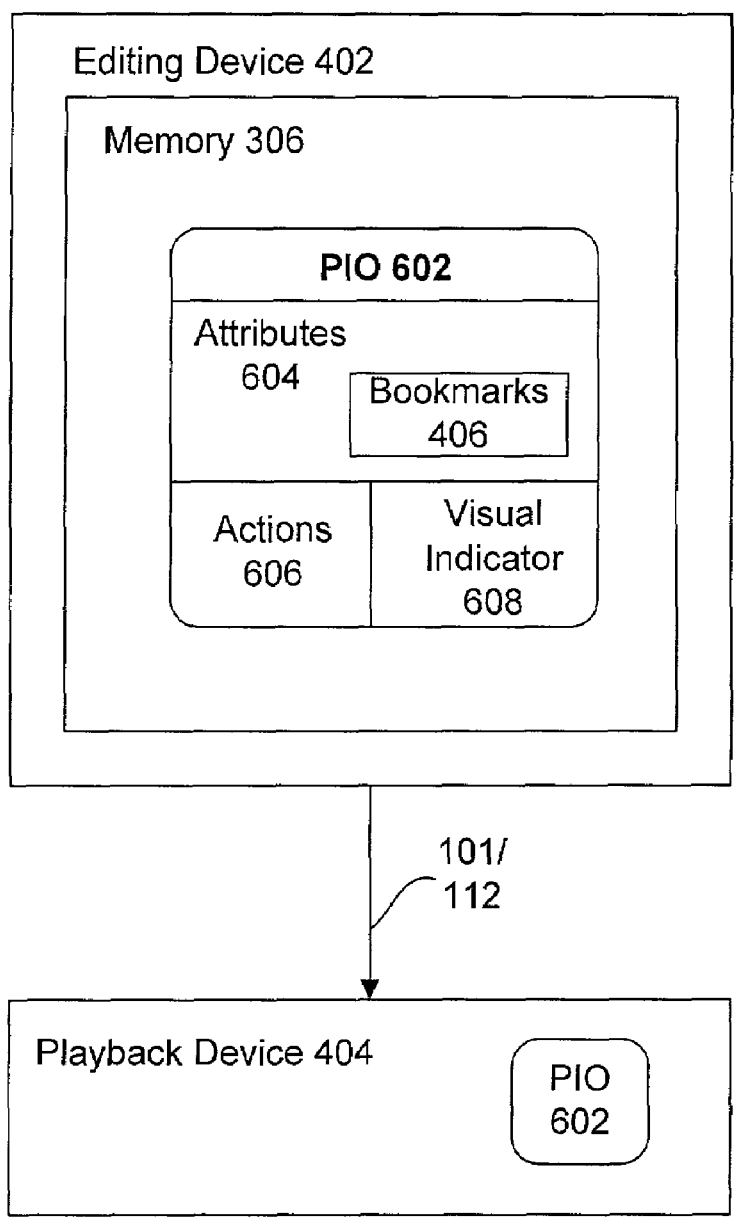
FIG. 6 is a block diagram of a program interface object (PIO) for distributing bookmarks.

Various other techniques may be used to transmit bookmarks 406 from an editing device 402 to a playback device 404. One such technique, as shown in FIG. 6, involves embedding one or more bookmarks 406 within a program interface object (PIO) 602.

In one embodiment, a PIO 602 is an object that includes a plurality of attributes 604 and actions 606. Actions 606 correspond to various operations that may be performed on or in connection with a media program represented by the PIO 602. For instance, one action 606 may schedule the recording of the program by a PVR. Another action may skip to a time or position indicated by a bookmark 406 during presentation of the media program. Actions 606 may be embodied, for example, as program code in a machine-independent format, such as Java or Javascript.

Attributes 604 contain information about the media program being represented. For example, attributes 604 may be used to store the title, starting time, stopping time, running time, actors, etc., associated with the media program. In addition, one or more attributes 604 may be used to store bookmarks 406.

In one implementation, each PIO 602 also includes a visual indicator 608, such as an icon, which is displayed in a graphical user interface (GUI) to facilitate user interaction with the PIO 602. The GUI may be displayed on an associated television 104 or other display device by the editing device 402 and the playback device 404. A user may interact with the PIO 602 via the visual indicator 608, and may execute various actions or view attributes by selecting the same from pull-down menus or other techniques.

Thus, bookmarks 406 may be encapsulated within a PIO 602 and transmitted from an editing device 402 to a playback device 404. The PIO 602 may be used by the devices 402, 404 for various purposes, depending on the actions and attributes provided. In particular, where bookmark attributes 604 and associated actions 602 are provided, a PIO 602 may be used to navigate from one point of interest to another during presentation of a media program. In addition, a visual indicator 608 may be used to select or display one of various sets of bookmarks 406 associated with a particular media program. As stated, each set of bookmarks may pertain, for instance, scenes in which a different actor or actress appears in a movie.

Figure 7:
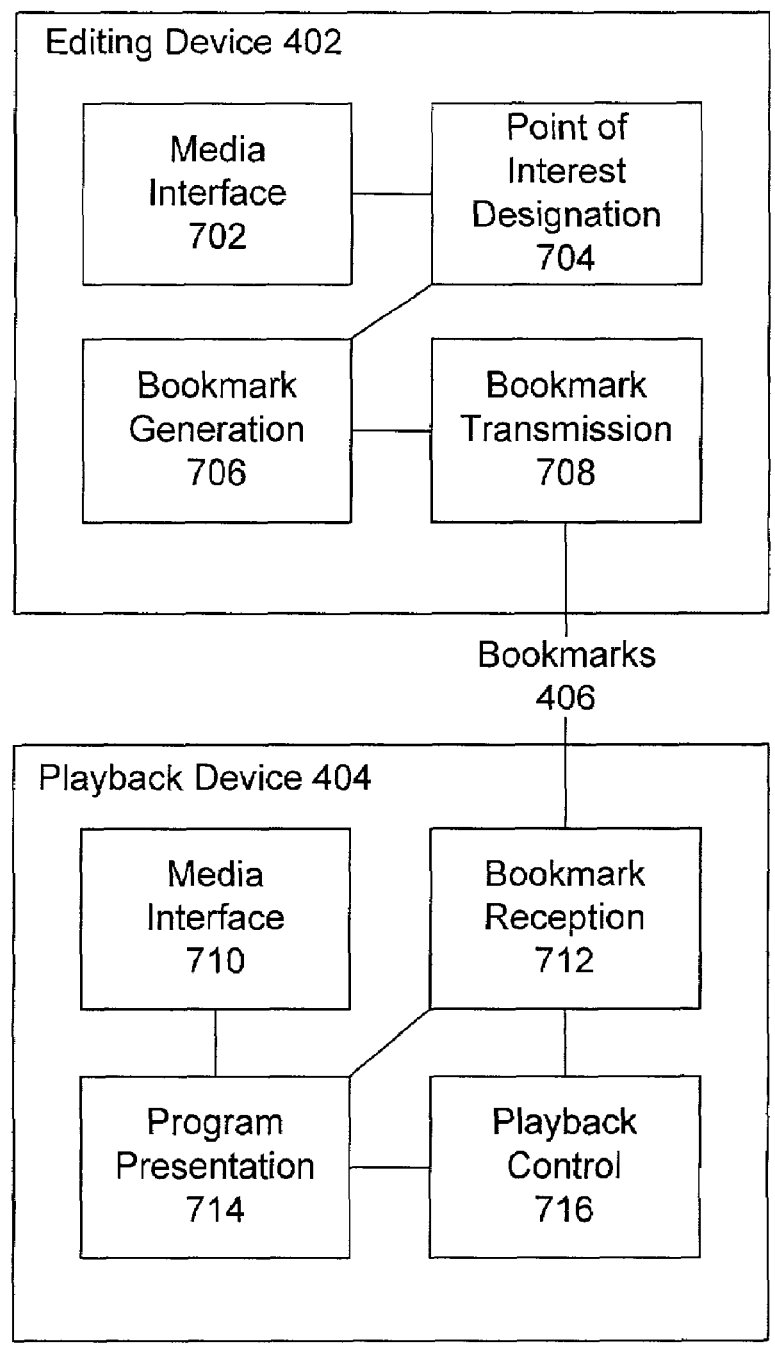
FIG. 7 is a logical block diagram of a system for creating and distributing personalized editions of media programs using bookmarks.

Referring now to FIG. 7, there is shown a block diagram of logical components of a system 700 for distributing personalized editions of media programs. The depicted logical components may be implemented using one or more of the physical components shown in FIG. 3. Additionally, or in the alternative, various logical components may be implemented as software modules stored in the memory 306 and/or storage device 310 and executed by the CPU 312.

In one implementation, a media interface component 702 of an editing device 402 accesses a media program to edited. The media interface component 702 may be embodied as a device or software program that accesses a physical storage medium, such as a DVD. Alternatively, the media interface component 702 may be embodied as a PVR configured to record the media program from a broadcast medium. Of course, a wide variety of media interface components 702 may be used within the scope of the invention, depending on the particular type of media in question.

A point of interest designation component 704 may be coupled to the media interface component 702. In one embodiment, the point of interest designation component is employed by a user of the editing device 402 to designate one or more points of interest within the media program. The point of interest designation component 704 may designate a point of interest in response to activation of a marking control 520, as explained above. Of course, various other techniques for designating a point of interest may be used within the scope of the invention.

In response to designation of a point of interest, a bookmark generation component 706, coupled to the point of interest designation component 704, generates a bookmark 406 defining the designated point of interest. As noted, the bookmark 406 may include, for instance, a time index, frame index, offset, chapter reference, scene reference, or other positional indicator within the media program.

Subsequently, a bookmark transmission component 708, coupled to the bookmark generation component 706, may transmit one or more generated bookmarks 406 from the editing device 402 to a playback device 404, as discussed above. The bookmarks 406 may be transmitted via a network, such as a broadband network 101 or the Internet, using any suitable protocol or technique.

A media interface component 710 of the playback device 404 also accesses a copy of the media program. The media program may be obtained from the same source or a different source as the editing device 402. For instance, both the editing device 402 and the playback device 404 may independently record the media program from a broadcast medium. Alternatively, each of the devices 402, 404 may receive a copy of a DVD including the media program.

A bookmark reception component 712 of the playback device 404 receives the transmitted bookmarks 406 sent from the editing device 402. Thereafter, the media program is presented by a presentation component 714, which is coupled to the bookmark reception component 712 and the media interface component 710. The presentation component 714 may be embodied as a hardware or software component configured to display the type of media program in question. A wide variety of presentation components 714 may be provided within the scope of the invention.

During presentation of the media program, a user of the playback device 404 may activate on-screen controls, such as a skip-backward control or a skip-forward control 512, 514. Alternatively, the user may employ similar buttons on a remote control 106. In response, a playback control component 716, coupled to the program presentation component 714 and the bookmark reception component 712, starts the presentation of the media program at a location defined by a previous or next bookmark 406, depending on which control 512, 514 is activated. Accordingly, a user may skip from one point of interest to another, and may even bypass segments of lesser interest (e.g., commercials), where a bookmark 406 is defined at the end of such segments.

Figure 8:
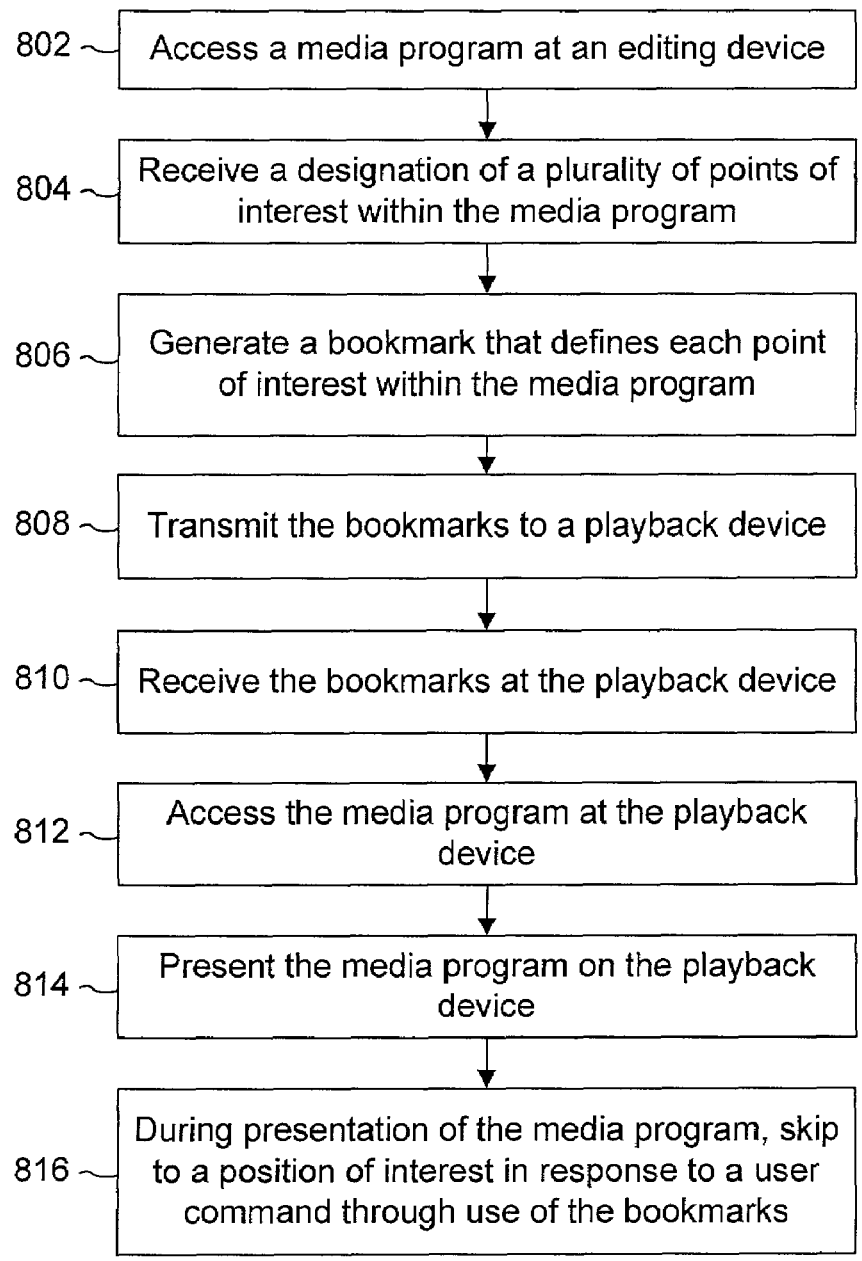
FIG. 8 is a flowchart of a method of creating and distributing personalized editions of media programs using bookmarks.

Referring now to FIG. 8, there is shown a flowchart of a method 800 for distributing personalized editions of media programs. In one implementation, a media program is accessed 802 at an editing device 402. Thereafter, a user designates one or more points of interest within the media program, which is received 804 by the editing device 402. In response, a bookmark 406 defining each designated point of interest is generated 806.

The bookmark(s) 406 are then transmitted 808 to and subsequently received 810 by a playback device 404. The media program is accessed 812 by the playback device 404 from a source other than the editing device 404. Once the media program is accessed, it is presented 814 on the playback device 404.

During presentation of the media program, in response to a user command (e.g., activation of a skip-backward or skip-forward control 512, 514), the playback device 404 skips 816 to previous or next point of interest through use of the received bookmarks 406.

In view of the foregoing, the present invention allows a user to share a personalized edition of a media program (e.g., a media program with a personalized navigation path) with one or more other users without the need to store or transmit large data files. Moreover, because the media program, itself, is not transmitted, copyrights are not affected.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A method for distributing personalized editions of media programs, the method comprising:
    accessing a first locally stored copy of a media program at an editing device;
    receiving a designation of at least two points of interest within the media program;
    generating a sequence of bookmarks defining a personalized path of skip-to points through the media program, each bookmark representing one of the designated points of interest within the media program; and
    transmitting the sequence of bookmarks from the editing device to a different playback device having access to a second locally stored copy of the media program, the second locally stored copy being obtained from a source other than the editing device, wherein the sequence of bookmarks is usable by the playback device to allow a user to skip, in response to a user command, to a next point of interest within the media program according to the sequence defined by the personalized path.

2. The method of claim 1, wherein skipping comprises:
    starting presentation of the media program at a position marked by a next bookmark in response to a skip-forward command received by the playback device.

3. The method of claim 2, wherein skipping comprises:
    starting presentation of the media program at a position marked by a previous bookmark in the sequence in response to a skip-backward command received at the playback device.

4. The method of claim 1, wherein transmitting comprises:
transmitting the sequence of bookmarks from the editing device to the playback device via a network.

5. The method of claim 4, wherein the network is selected from the group consisting of a cable television network, a direct broadcast satellite network, and the Internet.

6. The method of claim 1, wherein transmitting comprises:
transmitting the sequence of bookmarks from the editing device to the playback device using a wireless technique.

7. The method of claim 1, wherein transmitting comprises:
physically transporting the sequence of bookmarks from the editing device to the playback device on a removable storage medium.

8. The method of claim 7, wherein the removable storage medium is selected from a group consisting of a magnetic disk, an optical disc, and a non-volatile flash memory card.

9. The method of claim 1, wherein the sequence of bookmarks is encapsulated within a program interface object (PIO).

10. The method of claim 1, wherein at least one bookmark comprises a time reference.

11. The method of claim 1, wherein at least one bookmark comprises a non-time positional reference.

12. The method of claim 1, wherein at least one bookmark marks a beginning point of a segment of interest within the media program.

13. The method of claim 1, wherein at least one bookmark marks an end point of a segment comprising at least one advertisement within the media program.

14. The method of claim 1, wherein accessing comprises downloading the media program from a server.

15. The method of claim 1, wherein accessing comprises digitally recording the media program from a broadcast medium.

16. The method of claim 1, wherein accessing comprises accessing a removable storage medium including the media program.

17. The method of claim 16, wherein the removable storage medium comprises a digital versatile disk (DVD).

18. The method of claim 1, wherein the playback device comprises an interactive television (ITV) system.

19. The method of claim 1, wherein the editing device comprises an interactive television (ITV) system.

20. A system for distributing personalized editions of media programs, the system comprising:
an editing device comprising:
a media interface component that accesses a first locally stored copy of a media program;
a point of interest designation component that receives a designation of a plurality of points of interest within the media program;
a bookmark generation component that generates a sequence of bookmarks defining a personalized path of skip-to points through the media program, each bookmark representing one of the designated point of interest within the media program; and
a bookmark transmission component that transmits the sequence of bookmarks; and
a playback device having access to a second locally stored copy of the media program, wherein the playback device receives the sequence of bookmarks directly from the bookmark transmission component of the editing device, and wherein the sequence of bookmarks is usable by the playback device to skip from one point of interest to another within the media program according to the sequence defined by the personalized path in response to a user command.

21. The system of claim 20, the playback device comprising:
a media interface component that accesses the media program from a source other than the editing device;
a bookmark reception component that receives the sequence of bookmarks; and
a playback control component that, during presentation of the media program, skips to a point of interest marked by the sequence of bookmarks in response to a user command.

22. The system of claim 21, wherein the playback control component starts presentation of the media program at a position marked by a next bookmark in response to a skip-forward command received by the playback device.

23. The system of claim 21, wherein the playback control component starts presentation of the media program at a position marked by a previous bookmark in response to a skip-backward command received at the playback device.

24. The system of claim 20, wherein the bookmark transmission component transmits the sequence of bookmarks from the editing device to the playback device via a network.

25. The system of claim 24, wherein the network is selected from the group consisting of a cable television network, a direct broadcast satellite network, and the Internet.

26. The system of claim 20, wherein the bookmark transmission component transmits the sequence of bookmarks from the editing device to the playback device using a wireless technique.

27. The system of claim 20, wherein the bookmark transmission component stores the sequence of bookmarks on a removable storage medium to be physically transported from the editing device to the playback device.

28. The system of claim 27, wherein the removable storage medium is selected from a group consisting of a magnetic disk, an optical disc, and a non-volatile flash memory card.

29. The system of claim 20, wherein at least one bookmark comprises a time reference.

30. The system of claim 20, wherein at least one bookmark comprises a non-time positional reference.

31. The system of claim 20, wherein at least one bookmark marks a beginning point of a segment of interest within the media program.

32. The system of claim 20, wherein at least one bookmark marks an end point of a segment comprising at least one advertisement within the media program.

33. The system of claim 20, wherein the media interface component downloads the media program from a server.

34. The system of claim 20, wherein the media interface component digitally records the media program from a broadcast medium.

35. The system of claim 20, wherein the media interface component accesses a removable storage medium including the media program.

36. The system of claim 35, wherein the removable storage medium comprises a digital versatile disk (DVD).

37. The system of claim 20, wherein the playback device comprises an interactive television (ITV) system.

38. The system of claim 20, wherein the editing device comprises an interactive television (ITV) system.

39. A system for distributing personalized editions of media programs, the system comprising:

means for accessing a first local copy of a media program at an editing device;

means for receiving a designation of at least two points of interest within the media program;

means for generating a sequence of bookmarks defining a non-chronological path through the media program, each bookmark representing one of the designated points of interest within the media program; and means for transmitting the sequence of bookmarks defining the non-chronological path through the media program from the editing device to a playback device having access to a second local copy of the media program, wherein the sequence of bookmarks is usable by the playback device to skip from one point of interest to another within the media program along the non-chronological path in response to a user command.

40. A method for distributing personalized editions of media programs, the method comprising:

accessing a first locally stored copy of a media program at an editing device;

receiving a designation of at least two points of interest within the media program;

generating a sequence of bookmarks defining a non-chronological path through the media program, each bookmark representing one of the designated points of interest within the media program; and transmitting the sequence of bookmarks from the editing device to a different playback device having access to a second locally stored copy of the media program, the second locally stored copy being obtained from a source other than the editing device, wherein the sequence of bookmarks is usable by the playback device to allow a user to skip, in response to a user command, to a next point of interest within the media program according to the sequence defined by the non-chronological path.

41. A method for distributing personalized editions of media programs, the method comprising:

accessing a first locally stored copy of a media program at an editing device;

receiving a designation of at least two points of interest within the media program;

generating a sequence of bookmarks defining a personalized path through the media program, each bookmark representing one of the designated points of interest within the media program, at least one bookmark including supplemental information to be presented with the media program; and transmitting the sequence of bookmarks from the editing device to a different playback device having access to a second locally stored copy of the media program, the second locally stored copy being obtained from a source other than the editing device, wherein the sequence of bookmarks is usable by the playback device to allow a user to skip, in response to a user command, to a next point of interest within the media program according to the sequence defined by the personalized path.

42. The method of claim 41, wherein the supplemental information comprises a commentary by a user of the editing device.

43. The method of claim 41, further comprising overlaying the supplemental information upon the media program.

44. The method of claim 43, wherein overlaying comprises displaying the supplemental information in a picture-in-picture window.

45. The method of claim 44, wherein the supplemental information comprises a video commentary.

46. The method of claim 41, wherein the supplemental information comprises text.

47. The method of claim 41, wherein the supplemental information comprises a hyperlink.

48. The method of claim 41, wherein the supplemental information comprises audio.

49. The method of claim 41, wherein the supplemental information comprises video.

\* \* \* \* \*